United States Patent [19]

Eguchi

[11] Patent Number: 4,573,560
[45] Date of Patent: Mar. 4, 1986

[54] CLUTCH DRUM FOR MULTIPLE PLATE CLUTCH ASSEMBLY

[75] Inventor: Shinsuke Eguchi, Zama, Japan

[73] Assignee: Nissan Motor Co., Ltd., Yokohama, Japan

[21] Appl. No.: 525,379

[22] Filed: Aug. 22, 1983

[30] Foreign Application Priority Data

Aug. 23, 1982 [JP] Japan .................. 57-144757

[51] Int. Cl.$^4$ ............................................. F16D 25/10
[52] U.S. Cl. ................................. 192/87.1; 192/70.13
[58] Field of Search ............... 192/87.1, 87.11–87.19, 192/70.28, 7.13

[56] References Cited

U.S. PATENT DOCUMENTS

| 3,236,349 | 2/1966 | Wiggins et al. | 192/99 |
| 3,307,430 | 3/1967 | Bauder | 192/87.11 |
| 3,554,057 | 1/1971 | Michnay et al. | 192/87.11 |
| 4,014,619 | 3/1977 | Good et al. | 403/359 |
| 4,089,097 | 5/1978 | Good et al. | 29/163.5 R |

FOREIGN PATENT DOCUMENTS 1018539 1/1966 United Kingdom .
2073340 10/1981 United Kingdom .

Primary Examiner—Andrew M. Dolinar
Attorney, Agent, or Firm—Schwartz, Jeffery, Schwaab, Mack, Blumenthal & Evans

[57] ABSTRACT

Disclosed is a clutch drum for a multiple plate clutch assembly is disclosed. The clutch drum comprises a tubular body having a large diameter tubular section and a small diameter tubular section. An end plug is secured to the small diameter tubular section and has a tubular flange fit on the outer surface of the small diameter tubular section. The tubular flange is formed with axially extending slots. First clutch plates are disposed in the large diameter section and splined to the large diameter tubular section. Second clutch plates are disposed around the small diameter tubular section and engaged with axially extending slots of the tubular flange of the end plug. A clutch piston is slidably disposed in the small diameter tubular section.

11 Claims, 2 Drawing Figures

CLUTCH DRUM FOR MULTIPLE PLATE CLUTCH ASSEMBLY

BACKGROUND OF THE INVENTION

The present invention relates to a multiple plate clutch assembly for a power transmission gearing of an automatic transmission and more particularly to a clutch drum for a multiple plate clutch assembly.

Usually, in such a power transmission gearing, after being subjected to a torque multiplication by a torque converter, a rotary power of an engine drives a turbine which in turn drives an input shaft of the transmission mechanism, driving a forward clutch drum within the transmission mechanism during the forward drive. The forward clutch drum has mounted drive plates of a forward clutch inside as splined to the inner surface thereof and drive plates of a high and reverse clutch outside as splined to the outer surface thereof. Thus, the drive plates of the forward clutch and those of the high and reverse clutch rotate with the forward clutch drum.

When fluid pressure acts on a clutch piston of the high and reverse clutch, its drive plates and driven plates are interengaged so that the rotary power of the input shaft is transmitted through the forward clutch drum, the drive plates of the high and reverse clutch, the high and reverse clutch drum and a connecting shell to a sun gear to rotate same.

On the other hand, when the forward clutch is engaged, a front internal gear which is splined to a clutch hub of the forward clutch is rotated.

The known multiple plate clutch assembly is specifically described in connection with FIG. 1. FIG. 1 is a fragmentary sectional view of an automatic transmission illustrating a known multiple plate clutch assembly including a forward clutch and a high and reverse clutch which provide the above mentioned power delivery paths.

Referring to FIG. 1, the reference numeral 1 designates a forward clutch drum which is connected with an input shaft, not shown. The forward clutch drum 1 comprises a tubular portion 4 including a large diameter section 2, a contiguous small diameter portion 3, and an end plate portion integral with this tubular portion 4 closing off the axial end of the small diameter section 3. The large diameter section 2 of the tubular portion 4 has corrugations which define an inner spline 4a and an outer spline, not seen. The plurality of drive plates 6 of the forward clutch are mounted to the inner surface of the large diameter section via the inner spline 4a, while the plurality of drive plates 7 of the high and reverse clutch are mounted to the outer surface of the large diameter section 2 via the outer spline. Slidably received in seal tight manner in the small diameter section 3 of the tubular portion 4 is a clutch piston 8 of the forward clutch. The clutch piston 8 defines a fluid pressure chamber 9 between the piston 8 and the end plate portion 5.

Extending into the tubular body portion 4 is a forward clutch hub 10 connected with a front internal gear, not shown. A plurality of driven plates 12 engaged with a spline 11 of the outer surface of the forward clutch hub 10 are interleaved with the drive plates 6.

Disposed around the outer surface of the forward clutch drum 1 is a high and reverse clutch drum 13 which is connected with a sun gear, not shown. A plurality of driven plates 15 are engaged with a spline 14 formed on the inner surface of the high and reverse clutch drum 13 and interleaved with the drive plates 7.

The reference numeral 16 in FIG. 1 designates a clutch piston and the reference numeral 17 a return spring for this piston.

In operation, when the fluid pressure is admitted to the fluid pressure chamber 9 and thus the piston 8 of the forward clutch is actuated, the drive plates 6 and driven plates 12 are engaged, allowing the transmission of rotary power from the forward clutch drum 1 to the forward clutch hub 10. When the piston 16 of the high and reverse clutch is actuated, the drive plates 7 of the high and reverse clutch are engaged with the driven plates 15 thereof, allowing the transmission of rotary power from the forward clutch drum 1 to the high and reverse clutch drum 13.

Since, in this known clutch assembly, the inner surface of the small diameter section 3 of the forward clutch drum 1 must be finished smooth to receive the clutch piston 8 in seal tight manner, it is impossible to form a plurality of slots or spline on the small diameter section 3. Thus, the drive plates 7 of the high and reverse clutch have to be mounted to the outer surface of the large diameter section of the forward clutch drum 1.

The known clutch assembly has a problem that the diameter of the high and reverse clutch 13, i.e. that of the clutch assembly, is large. Another problem is that the axial length of the clutch piston 16 of the high and reverse clutch is long, thus relatively large waste spaces A and B created between the forward clutch drum 1 and the high and reverse clutch drum 13.

SUMMARY OF THE INVENTION

According to the present invention there is provided a clutch drum for a multiple plate clutch assembly having a first clutch including first clutch plates and a clutch piston, and a second clutch including second clutch plates, the clutch drum comprising:

a large diameter tubular section adapted to mount therein the first clutch plates;

a small diameter tubular section contiguous to the large diameter tubular section and adapted to slidably receive the clutch piston;

first means, on the large diameter tubular section, for mounting the first clutch plates to the large diameter tubular section; and second means for mounting the second clutch plates to the small diameter tubular section.

According to another aspect of the present invention, there is provided a clutch drum for a multiple plate clutch assembly having a first clutch including first clutch plates and a clutch piston, and a second clutch including second clutch plates, the clutch drum comprising:

a tubular body having a large diameter tubular section adapted to mount therein the first clutch plates and a small diameter tubular section contiguous to the large diameter tubular section and adapted to mount therein the clutch piston, the large diameter tubular section being formed with first means for mounting the first clutch plates to the large diameter tubular section; and an end plug secured to the small diameter tubular section to sealably close one end of the small diameter tubular section, the end plug having a tubular flange fit on the outer surface of the small diameter tubular section, the tubular flange being formed with second means for mounting the second clutch plates to the end plug.

Accordingly, an object of the present invention is to provide a clutch drum for a multiple plate clutch assembly which allows a reduction in diameter and in weight of the multiple plate clutch assembly.

Still another object of the present invention is to provide a clutch drum which is easy to manufacture by press forming.

Yet another aspect of the present invention is to provide a multiple plate clutch assembly comprising:

a first clutch including first clutch plates and a clutch piston;

a second clutch including second clutch plates;

a large diameter tubular section mounting therein the first clutch plates;

a small diameter tubular section contiguous to the large diameter tubular section and slidably receiving therein the clutch piston;

first means, on the large diameter tubular section, for mounting the first clutch plates to the large diameter tubular section; and second means for mounting the second clutch plates to the small diameter tubular section.

DETAILED DESCRIPTION OF THE INVENTION

The present invention is described hereinafter in connection with FIG. 2 of the accompanying drawing.

Figure 2:
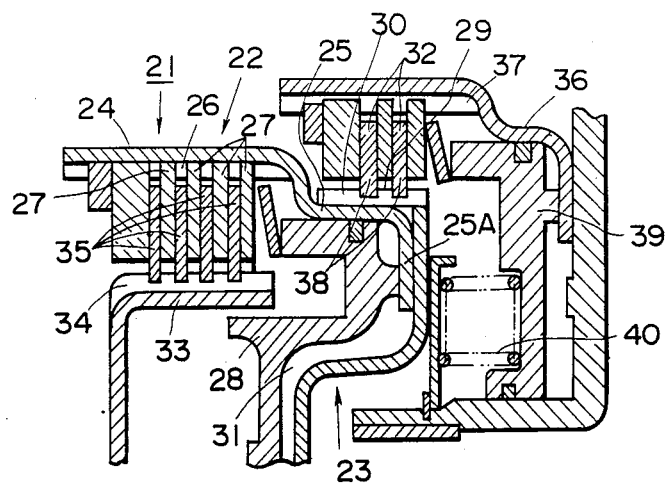
FIG. 2 is a similar view to FIG. 1 illustrating a preferred embodiment according to the present invention.

Referring to FIG. 2, a forward clutch drum 21 comprises a tubular body 22 and an end plug 23 which are separate pieces. Preferably, the tubular body 22 is press formed from a sheet of metal, and the end plug 23 is press formed from a sheet of metal.

The tubular body 22 includes a large diameter section 24 and a small diameter section 25 contiguous with the large diameter section 24, and this large diameter section 24 has formed on its inner surface a spline 26 with which the large diameter section 24 has mounted therein a plurality of drive plates 27 of a forward clutch. The small diameter section 25 has a smooth inner surface slidably receiving a clutch piston 28.

The end plug 23 has an integral tubular flange 29 extending from its rim. The tubular flange 29 has an inner diameter substantially equal to the outer diameter of the small diameter section 25. The tubular flange 29 has formed on its outer surface a purality of axially extending grooves in the form of axially extending slots 30. Alternatively, a spline may be formed on the outer surface of the tubular flange 29. The end plug 23 is secured to the tubular body 22 with its tubular flange 29 fit with the outer surface of the small diameter section 25 and with its rim portion connected in seal tight manner to an inwardly directed end wall 25A of the small diameter section 25, thus defining a fluid pressure chamber 31 between the piston 28 and the end plug 23. The axially extending slots 30 formed through the tubular flange 29 of the end plug 23 cooperate with the outer surface of the small diameter section 25 to form a plurality of grooves engaging with drive plates 32 of a high and reverse clutch. Thus, the drive plates 32 engaging with the axially extending slots 30 will rotate together with the drive plates 27 as the forward clutch drum 21 rotates.

Interleaved with the drive plates 27 are driven plates 35 which are engaged with a spline 34 formed on a forward clutch hub 33. Interleaved with the drive plates 32 are driven plates 38 which are engaged with a spline 37 on a high and reverse clutch drum 36.

The reference numeral 39 designates a piston which is slidably disposed within the high and reverse clutch drum 36 to engage the driven plates 38 with the drive plates 32, and the reference numeral 40 a return spring for the piston 39.

Figure 1:
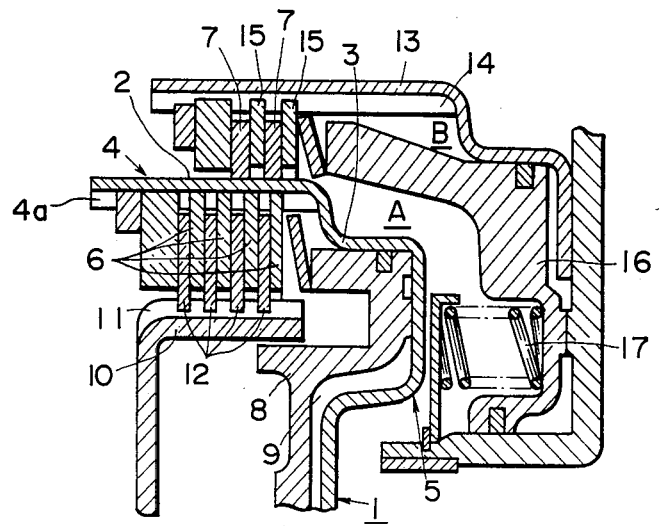
FIG. 1 is a fragmentary sectional view of an automatic transmission illustrating the known multiple plate clutch assembly discussed above.

The clutch assembly thus constructed operates like the clutch assembly shown in FIG. 1. When the admission of fluid pressure to the fluid pressure chamber 31 displaces the piston 28 to the left, as viewed in FIG. 2, the drive plates 27 are engaged with the driven plates 35, allowing the transmission of rotary power from the forward clutch drum 21 to the forward clutch hub 33. When, on the other hand, the piston 39 of the high and reverse clutch is displaced to the left, as viewed in FIG. 2, the driven plates 38 are engaged with the drive plates 32, allowing the transmission of rotary power from the forward clutch drum 21 to the high and reverse clutch drum 36. When both of the pistons 28 and 39 are displaced to the left, rotary power is transmitted to the forward clutch hub 33 and also th the high and reverse clutch drum 36.

Since the provision of the axially extending slots 30 around the small diameter section 25 allows the drive plates 32 of the high and reverse clutch to be arranged around the outer surface of the small diameter section 25, the diameter of the high and reverse clutch drum 36 is smaller than that of the counterpart 13 of the known clutch assembly shown in FIG. 1. Besides, the axial length of the high and reverse clutch drum 36 and that of the piston 39 are shorter than those of the counterparts 13 and 16 of the known clutch assembly, respectively. Therefore, the weight and cost of the high and reverse clutch drum 36 and those of the piston 39 have been reduced as compared to the known clutch assembly shown in FIG. 1, contributing to a reduction in the weight of the multiple plate clutch assembly.

A number of steps are required in manufacturing the forward clutch drum 1 of the known clutch assembly shown in FIG. 1 by press forming. However, because the forward clutch drum 21 is formed of the tubular body 22 and the end plug 23 which are separate pieces, it has been made easy to form them by plastic forming such as press forming, resulting in a reduction in number of manufacturing steps.

Although in the case of the above mentioned embodiment, the tubular flange 29 is fit with the outer surface of the small diameter section 25 and formed with axially extending slots 30, this relationship may be reversed such that the small diameter section 25 is fit in fluid tight manner with the inner surface of the tubular flange 29 and formed with an outer spline.

As will be apparent from the preceding description, according to the present invention, it has been made easy to manufacture the forward clutch drum 21, and the weight and dimension of the high and reverse clutch drum 36 and those of the piston 39 have been reduced.

I claim:

1. A clutch drum for a multiple plate clutch assembly having a first clutch including first clutch plates and a clutch piston, and a second clutch including second clutch plates, said clutch drum comprising:

a tubular body including a large diameter tubular section adapted to mount therein the first clutch plates, and a small diameter tubular section contiguous to said large diameter tubular section and adapted to slidably receive therein the clutch piston;

means, on said large diameter tubular section, for mounting the first clutch plates to said large diameter tubular section; and, an end plug secured to said small diameter tubular section to sealably close one end of said small diameter tubular section, said end plug having a tubular flange, wherein said tubular flange is fit on the outer surface of said small diameter tubular section, and said tubular flange is formed with a plurality of axially extending slots serving as means for mounting the second clutch plates to said small diameter tubular section.

2. A clutch drum as claimed in claim 1, wherein said small diameter tubular section has an inner surface slidably engageable with the clutch piston.

3. A clutch drum for a multiple plate clutch assembly having a first clutch including first clutch plates and a clutch piston, and a second clutch including second clutch plates, said clutch drum comprising:

a tubular body having a large diameter tubular section adapted to mount therein the first clutch plates and a small diameter tubular section contiguous to said large diameter tubular section and adapted to slidably receive therein the clutch piston, said large diameter tubular section being formed with first means for mounting the first clutch plates to said large diameter tubular section; and an end plug secured to said small diameter tubular section to sealably close one end of said small diameter tubular section, said end plug having a tubular flange fit on the outer surface of said small diameter tubular section, said tubular flange being formed with second means for mounting the second clutch plates to said end plug.

4. A clutch drum as claimed in claim 3, wherein said end plug and said small diameter tubular section cooperate with the piston to define a fluid pressure chamber between the piston and said end plug.

5. A clutch drum as claimed in claim 4, wherein said small diameter tubular section includes an inwardly extending end wall which is connected with said end plug in a tight seal manner.

6. A clutch drum as claimed in claim 3, wherein said first means is in the form of a spline formed on the inner surface of said large diameter tubular section.

7. A clutch drum as claimed in claim 3, wherein said second means is in the form of a spline formed on the outer surface of the tubular flange.

8. A clutch drum as claimed in claim 3, wherein said second means is in the form of axially extending slots formed through said tubular flange.

9. In a multiple plate clutch assembly:
a first clutch including first clutch plates and a clutch piston;
a second clutch including second clutch plates;
a large diameter tubular section mounting therein the first clutch plates;
a small diameter tubular section contiguous to said large diameter tubular section and slidably receiving therein said clutch piston;
first means, on said large diameter tubular section, for mounting said first clutch plates to said large diameter tubular section; and
an end plug secured to said small diameter tubular section to sealably close one end of said small diameter tubular section, said end plug having a tubular flange fit on the outer surface of said small diameter tubular section and formed with second means for mounting said second clutch plates to said small diameter tubular section.

10. A clutch drum for a multiple plate clutch assembly having a first clutch including first clutch plates and a clutch piston, and a second clutch including second clutch plates, said clutch drum comprising:

a tubular body including a first section adapted to mount therein the first clutch plates and a second section adapted to slidably receive therein the clutch piston;

an end plug secured to said second section to sealably close one end of said second section, said end plug having a tubular flange; and means, on said first section, for mounting the first clutch plates to said first section, wherein said tubular flange is fit on the outer surface of said second section, and said tubular flange is formed with a plurality of axially extending slots serving as means for mounting the second clutch plates to said second section.

11. A clutch drum for a multiple plate clutch assembly having a first clutch including first clutch plates and a clutch piston, and a second clutch including second clutch plates, said clutch drum comprising:

a tubular body having a first tubular section adapted to mount therein the first clutch plates and a second tubular section contiguous to said first tubular section and adapted to slidably receive therein the clutch piston, said first tubular section being formed with first means for mounting the first clutch plates to said first tubular section; and an end plug secured to said second tubular section to sealably close one end of said second tubular section, said end plug having a tubular flange fit on the outer surface of said second tubular section, said tubular flange being formed with second means for mounting the second clutch plates to said end plug.

* * * * *